Warren A. Alexander Inventor

By W. O. T Heilman Attorney

Patented Jan. 1, 1952

2,581,063

UNITED STATES PATENT OFFICE 2,581,063

GEOPHONE

Warren A. Alexander, Tulsa, Okla., assignor to Standard Oil Development Company, a corporation of Delaware Application March 16, 1950, Serial No. 150,097

3 Claims. (Cl. 177—352)

This invention relates to a novel type of geophone or seismic pickup to be used for the detection of seismic energy, and the conversion of this energy to electrical energy. The geophone of this invention simply consists of a metallic plate variably spaced from a permanently electrified substance. The construction is such that seismic energy acting on the geophone varies the position of the metallic plate with regard to the permanently electrified material so as to develop a varying charge on the plate. The electrical signal developed by the plate may then be amplified and recorded as desired.

In many applications, particularly in the search for oil by seismographic methods, delicate instruments are required capable of transforming mechanical vibrations, or motions into electrical energy. These instruments are generally called geophones or seismic pickups. It is the particular object of this invention to provide an instrument of this character having advantages as regards simplicity of construction, maintenance and use.

In accordance with this invention a geophone is constructed essentially containing two elements. First a permanently electrified material which has been called an "electret" is positioned in the geophone. Adjacent the electret, on a spring mounting, is a plate composed of electrically conductive material, preferably metallic. The nature of the electret is such that as the proximity of the plate from the electret varies, the charge induced on the plate will also vary. Since the plate will vary in distance from the electret at a frequency about that of seismic energy affecting the geophone, an alternating current will be developed in the plate which may be amplified and recorded by conventional methods. It may, therefore, be appreciated that the geophone of this invention is an extremely simple and uncomplicated type of apparatus.

Figure 1:
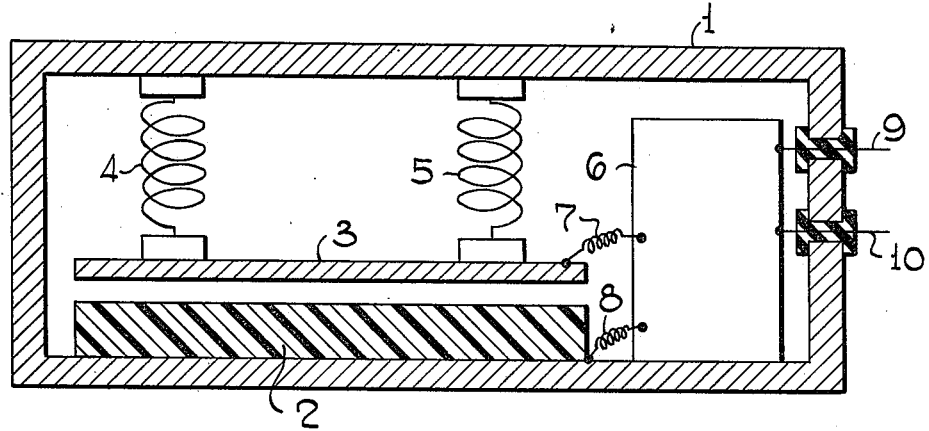

Referring to Figure 1 of the drawing a geophone is diagrammatically illustrated embodying the principles of this invention. The particular geophone illustrated is of the type identified as an area geophone particularly adapted for positioning on the surface of the ground for the receipt of seismic energy traveling upwardly to the surface. As indicated, the geophone consists of an external housing 1, containing the electret element 2. The electret may be made of any desired materials capable of maintaining a permanent electrification. As the nature and construction of the electret is not a part of this invention further details of this element of the apparatus will not be set forth. This material may be understood by referring to "Reviews of Modern Physics" for July 1948, vol. 20, page 457, et seq. It is to be understood then that element 2 in the drawing is a permanently electrified material characterized by the maintenance of opposite electrical charges on the two faces of it. For example the electret may be positioned so that the upper surface of it exhibits a positive charge. It is apparent then that if a metallic body is brought in proximity to the electret a charge will be induced in this body. Thus, by positioning a metallic plate, or other conductive material 3, parallel to and adjacent to the electret, the distance of this plate from the electret may be indicated by the charge on the plate. Again by varying the distance of the plate from the electret, the frequency of displacement variation may be determined from the frequency with which the charge of the plate varies. Towards this end the plate 3 may be supported by springs 4 and 5 so as to maintain the plate above the electret in a vertically variable manner. It is apparent then that upon receipt of seismic energy coming upwardly through the earth, movement of the housing 1 will cause the plate 3 to vibrate so as to vary its position from the electret. The result of this will be that an alternating current will be generated by the plate, having a frequency of the seismic energy and having an intensity proportional to the intensity of the seismic energy. Consequently, by coupling the plate 3 and housing 1 to an amplifying and recording system, the desired information as to the seismic energy may be obtained. As illustrated, in the drawing, a coupling unit 6 may be employed which is preferably positioned in the housing 1 as an integral part of the geophone apparatus. One lead 7, leads from the plate 3 to the coupling unit while a second lead 8 is connected to the housing 1 and to the coupling unit. Leads 7 and 8 may lead to the input of a cathode follower matching unit, or they may lead to an electronic amplifier, or any other desired type of electrical coupling apparatus. It is preferred, however, that the signal developed across leads 7 and 8 be subjected to some amplification prior to transmission through conductors 9 and 10 extending from the geophone housing. The signals developed by leads 9 and 10 may then be recorded in the conventional fashion.

Figure 2:
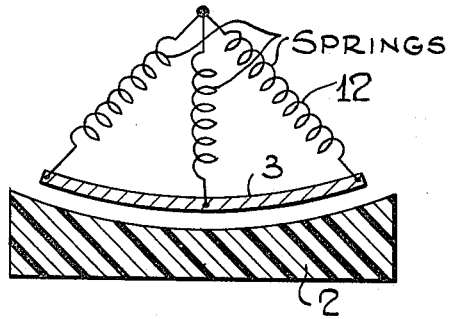

A particularly desirable type of structure is illustrated in Fig. 2. The surface of the electret 2 is spherical concave while the surface of the plate 3 is spherical convex. Springs 12 elastically support the plate 3 above the electret 2 so that the curved surfaces are positioned in non-touching, substantially parallel concentric relation. This type of structure discriminates against horizontal waves but responds to vertical waves. It is to be noted that the plate area is preferably smaller than the concave area of the electret, thus permitting the plate to move horizontally without any overlapping of the electret.

It is desired that the natural period of the plate mass and spring elasticity be greater than that of the seismic signals to be recorded.

What is claimed is:

1. A geophone having greater sensitivity to vertical seismic impulses than to horizontal seismic impulses comprising a permanently electrified body having a curved surface, an electrically conductive body having a curved surface, corresponding in general shape to said first curved surface, one of said surfaces being essentially spherical concave and the other of said surfaces being essentially spherical convex, and spring means elastically supporting one of said bodies above the other body in a manner positioning said curved surfaces in non-touching, substantially parallel concentric relation.

2. Geophone as defined by claim 1 wherein the surface area of one of said surfaces is less than that of the other surface.

3. A geophone having greater sensitivity to vertical seismic impulses than to horizontal seismic impulses comprising a housing, an electret element supported horizontally within said housing, said electret element having an upper curved surface of essentially spherical concave shape, an electrically conductive body having a lower surface of essentially spherical convex shape corresponding generally to the shape of the upper surface of said electret element, spring means fastened to said housing and elastically supporting said electrically conductive body above said electret element in a manner positioning said curved surfaces in non-touching, substantially parallel concentric relation, and means electrically connected to said electret element and to said conductive body whereby the electrical charge induced in said conductive body can be measured as a function of the vibrating motion of said conductive body relative to said electret element.

WARREN A. ALEXANDER.

REFERENCES CITED

The following references are of record in the file of this patent:

UNITED STATES PATENTS

| Number | Name | Date |
| --- | --- | --- |
| 2,024,705 | Rutherford | Dec. 17, 1935 |
| 2,257,187 | Owen | Sept. 30, 1941 |
| 2,272,984 | Ritzmann | Feb. 10, 1942 |
| 2,316,915 | Truman | Apr. 20, 1943 |
| 2,340,213 | Ellsworth | Jan. 25, 1944 |